UNITED STATES PATENT OFFICE.

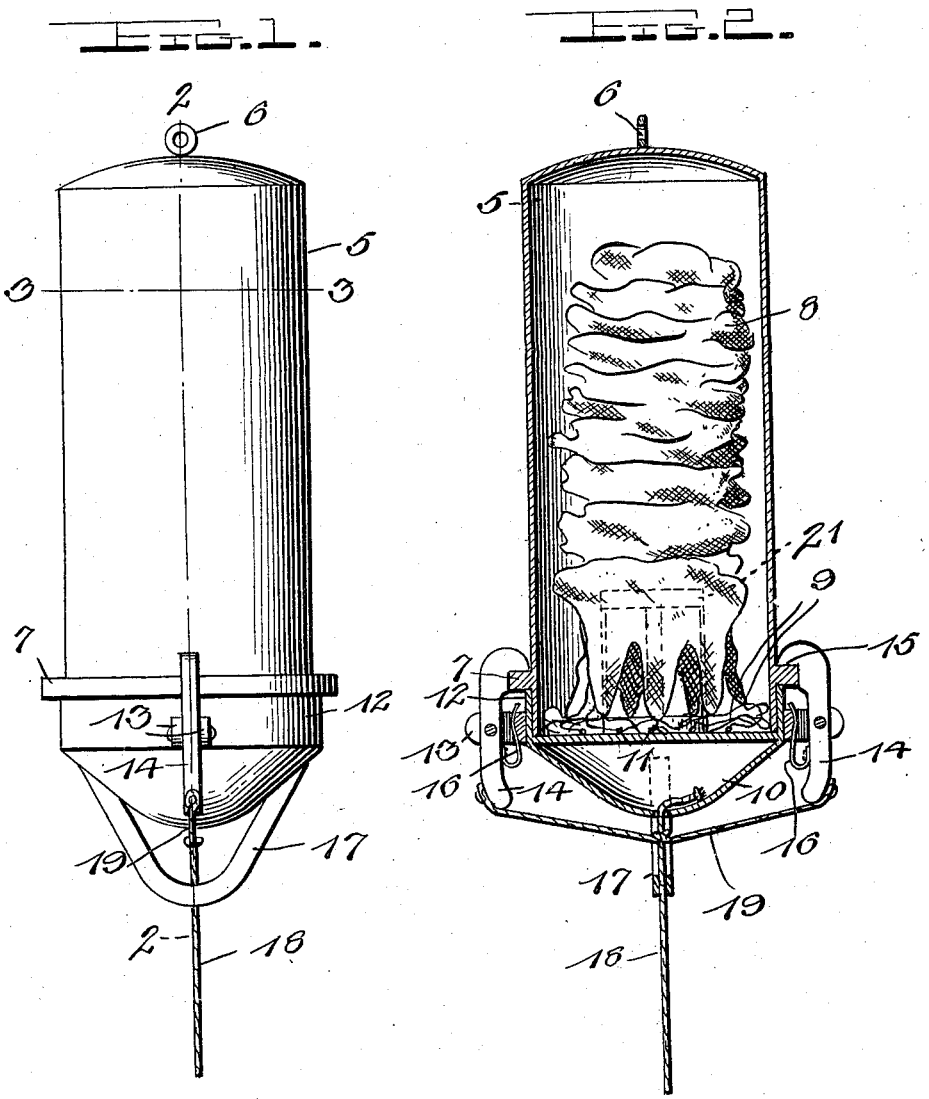

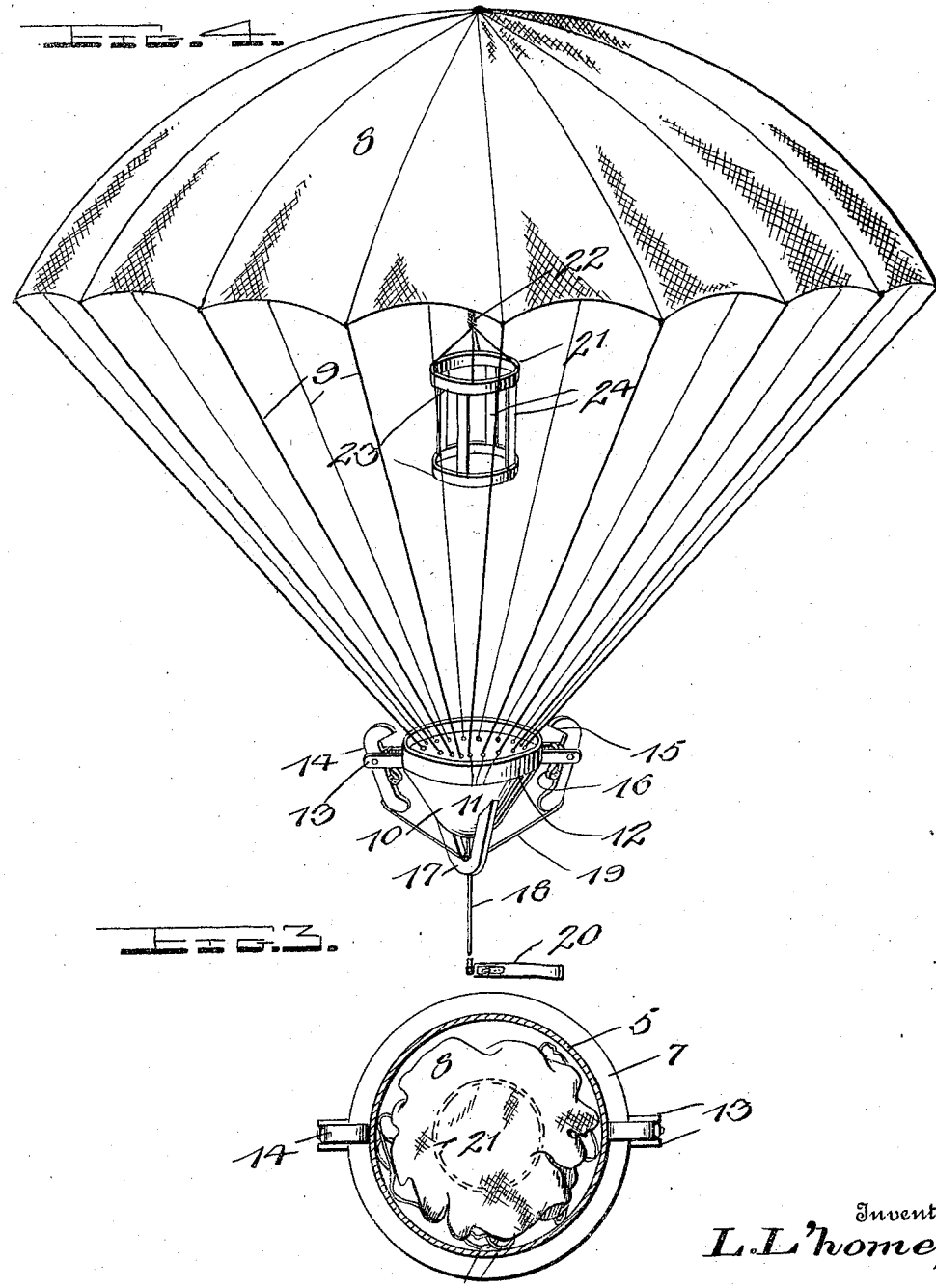

LEO L'HOME, OF PERRYVILLE, MISSOURI, ASSIGNOR OF ONE-HALF TO EDWARD ROPP OF PERRYVILLE, MISSOURI.

PARACHUTE.

1,052,489.    Specification of Letters Patent.    Patented Feb. 11, 1913.

Application filed July 20, 1912. Serial No. 710,720.

*To all whom it may concern:*

Be it known that I, LEO L'HOME, a citizen of the United States, residing at Perryville, in the county of Perry and State of Missouri, have invented certain new and useful Improvements in Parachutes, of which the following is a specification, reference being had to the accompanying drawings.

This invention relates to improvements in parachutes and more particularly to a parachute which is especially designed for use in connection with aeroplanes, balloons and all types of aerial vessels, the invention having for its primary object to provide improved means for mounting the parachute body whereby the same will be released and will immediately unfold under the weight of the body of a passenger.

Another object of the invention is to provide improved means to prevent the cords or cables attached to the edge of the parachute body from becoming tangled which would preclude the proper opening of the parachute.

Another and more specific object of the invention is to provide a casing mounted upon the aeroplane or other vessel wherein the parachute is wholly contained, means connected to the flexible body of the parachute by the guy ropes or cables to normally retain the parachute in its folded condition within said casing, said latter means being released from connection with the casing by the weight of a body connected thereto, and additional means centrally connected to the parachute body and positioned between the folds thereof at their outer edges to permit the immediate access of air between said folds as the parachute moves out of its casing.

A still further object of the invention is to provide a parachute for aerial vessels which is at all times in condition for emergency service, and is of such construction that liability of the flexible body of the parachute failing to unfold is rendered absolutely impossible, the entire device occupying but a minimum of space and being strong and durable in construction while of comparatively light weight.

With the above and other objects in view, the invention consists in the novel features of construction and the combination and arrangement of parts hereinafter more fully described, pointed out in the claims and shown in the accompanying drawings in which, Figure 1 is a side elevation showing the casing wherein the body of the parachute is contained and the cap to close one end of the casing and the means for retaining the cap thereon. Fig. 2 is a longitudinal section taken on the line 2—2 of Fig. 1. Fig. 3 is a section taken on the line 3—3 of Fig. 1 and Fig. 4 is a perspective view showing the parachute removed from its casing and unfolded.

Referring in detail to the drawing, 5 designates the casing which is preferably of cylindrical form and is closed at one end. The closed end of this casing is provided with an eye indicated at 6 whereby the casing may be attached to any convenient part of the structure of the aerial vessel, by means of a chain, cable or other connection. Adjacent to the open end of the casing 5, the same is provided with an exterior annular flange 7 the purpose of which will be made apparent in the following description.

The parachute proper includes a foldable flexible body 8 which may be made of canvas, oiled silk or any other desired material. To the edges of this flexible body, the usual ropes or cables 9 are connected at one of their ends. A substantially conical shaped cap 10 is provided in one end with a plurality of eyes 11 to which the other ends of the ropes or cables 9 are secured. This cap 10 is provided with an upstanding circumscribing flange 12 which projects above the end face of the cap in which the eyes 11 are arranged. This flange is adapted to engage over the open end of the cylindrical container or casing 5 and abut against the under surface of the annular flange 7 upon the casing wall. The cap 10 is provided at diametrically opposite points and upon the flange 12 with the laterally extending spaced ears 13. Between each of these pairs of ears a holding dog 14 is arranged having a shoulder 15 on one end to engage over the flange 7 of the casing 5. Leaf springs 16 yieldingly retain said dogs in engagement with the flange 7, and hold the cap 10 upon the open end of the cylindrical casing. A curved bar 17 is fixed at its ends to the cap 10, the intermediate portion of said bar being spaced from the cap, and provided with an opening through which a rope or cable 18 is loosely disposed. The end of this rope or cable is connected to the cap 10. Short wires or cables 19 are attached at one of their ends to the dogs 14 and have their other ends connected to the rope 18 between the bar 17 and the cap 10. The rope 18 is provided at its other end with a waist belt 20 which is adapted to be passed around the waist of the person making the descent and securely fastened together at its ends.

A skeleton frame or cage 21 is centrally connected to the body 8 of the parachute by means of a rope or other flexible connection 22. This cage consists of spaced rings 23 connected by means of a plurality of parallel bars 24. When the parachute is folded and disposed within the casing 5, the cage 21 rests upon the flat end face of the cap 10 within the confines of the circular series of eyes 11. The ropes or cables 9 of the parachute are disposed in the space between this cage and the wall of the casing and the edge of the folded parachute body lies against the bars 24 of the cage.

In the operation of the device, the parachute being contained within the casing and the cap applied to the end of the casing as shown in Fig. 1, when it is desired to leave the aeroplane or other vessel in the event of accident thereto, the passenger buckles the belt 20 around his waist and jumps from the machine. The weight of the descending body will pull upon the cables or wires 19, thereby throwing the ends 15 of the dogs 14 outwardly off of the flange 7 of the casing 5 so that the cap 10 will be released from the end of the casing. The casing remains attached to the frame of the vessel while the body of the parachute moves out of the open end thereof. The skeleton cage 21 insures access of air to and between the folds of the flexible body 8 of the parachute so that they will immediately unfold as soon as the parachute is free from the casing 5 and assume the appearance shown in Fig. 4. Thus the descent of the parachute will be immediately checked and the operator will safely descend to the ground without injury.

From the foregoing it is believed that the construction and manner of use of my improved parachute will be clearly understood by providing the skeleton cage 21 to hold the folds of the parachute open at their edges, said parachute may be contained within a cylinder or casing of relatively small dimensions so that the entire device will occupy but little space upon the aeroplane or other vessel to which it is applied. It will also be seen that by means of my improved construction of the cap 10, that said cap will be removed as soon as the holding dogs 14 are released by the weight of the body attached to the rope 18, irrespective of the position of the cylinder 5. The device will thus be very reliable and efficient in actual use and provides an emergency parachute for vessels used in aerial navigation which may be manufactured at comparatively small cost, consists of few elements and is therefore light and durable.

The various parts of the device may be constructed of any desired materials which may be found serviceable for the purpose, and of other form and proportions than those illustrated in the drawings.

The invention is also susceptible of a great many other minor modifications without departing from the essential features or sacrificing any of the advantages thereof.

What I claim is:—

1. In a parachute, a foldable flexible body, a skeleton cage attached to said body and disposed between the folds thereof at their edges, when said body is folded to facilitate the entrance of air into and between the folds.

2. In a parachute, a foldable flexible body, a skeleton cage, a flexible element secured centrally to the body at one of its ends and having its other end attached to the cage, said cage being disposed within the folds of the body at their edges when said body is folded to facilitate the entrance of air into and between said folds.

3. In a parachute, a foldable flexible body, a cage consisting of spaced annular members and a plurality of spaced bars connecting said members, a flexible element attached at one of its ends centrally to the body and at its other end to one of the annular members of the cage, said cage being disposed between the folds of the body at their edges when the body is folded to facilitate the entrance of air into and between said folds.

4. In a parachute attachment for aerial vessels, a casing open at one end, a flexible parachute body adapted to be folded and arranged within said casing, a cap to close the open end of the casing, flexible connections between the edge of the parachute body and said cap, a skeleton cage connected to the parachute body and disposed between the folds of the body at their edges, spring pressed holding dogs mounted upon the cap, an annular flange formed upon the casing to be engaged by said dogs, and a flexible element connected to said dogs whereby the same are actuated by the weight of a body suspended from said element to release the cap from the end of the casing.

5. In a parachute attachment for aerial vessels, a cylindrical casing open at one end, a parachute comprising a foldable flexible body adapted to be contained within said casing, said body having an annular exterior flange adjacent its open end, a cap to be engaged upon the open end of the casing to close the same, retaining means mounted upon the cap to engage said flange and hold the cap upon the casing, cables connecting the parachute body at its edge to said cap, means centrally connected to the parachute body and resting upon the cap when the parachute is disposed within the casing to prevent entanglement of the cables, a flexible member connected to the cap, end connections between said member and the cap retaining means whereby said retaining means is actuated by the weight of the body suspended from said flexible member to release the cap from the end of the casing.

6. In a parachute attachment for aerial vessels, a casing open at one end, a parachute to be contained within said casing, a closure upon the open end of the casing to which said parachute is connected, retaining means to hold the closure upon the open end of the casing, a flexible element connected to the closure for attachment to the body, and connections between said element and the retaining means whereby the closure is released from the open end of the casing under the weight of the body.

7. In a parachute attachment for aerial vessels, a casing open at one end, a parachute to be contained within said casing, a closure for the open end of the casing, said parachute being connected to the closure, retaining means carried by the closure to hold the same upon the open end of the casing, and means connected to said retaining means and adapted for attachment to the body, whereby the closure is released from the end of the casing under the weight of the said body.

8. In a parachute attachment for aerial vessels, a casing open at one of its ends, a parachute to be contained within said casing, said casing being provided with an exterior annular flange adjacent its open end, a closure for the open end of the casing, retaining elements mounted upon the closure and engaging over said flange to hold the closure on the end of the casing, said parachute being connected to the closure, and means connected to said retaining elements and adapted for attachment to the body whereby said retaining elements are moved to their release positions under the weight of the body, substantially as and for the purpose specified.

In testimony whereof I hereunto affix my signature in the presence of two witnesses.

LEO L'HOME.

Witnesses:
F. DENIZET,
IRBY B. FARRAR.

---

Copies of this patent may be obtained for five cents each, by addressing the "Commissioner of Patents, Washington, D. C."